(12) United States Patent
Watanabe et al.

(10) Patent No.: US 7,832,512 B2
(45) Date of Patent: Nov. 16, 2010

(54) HYBRID VEHICLE

(75) Inventors: Hideto Watanabe, Toyota (JP); Eiji Ichioka, Toyota (JP); Takemi Tamura, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/588,355

(22) Filed: Oct. 13, 2009

(65) Prior Publication Data

US 2010/0094498 A1 Apr. 15, 2010

(30) Foreign Application Priority Data

Oct. 15, 2008 (JP) .............................. 2008-266575

(51) Int. Cl.
*B60W 10/06* (2006.01)
(52) U.S. Cl. .............................. 180/65.28; 180/65.265; 180/65.275; 475/159; 477/3; 701/22; 701/102
(58) Field of Classification Search ............... 180/65.1, 180/65.265, 65.275, 65.28, 65.285, 65.6; 475/5, 159; 477/3, 5; 701/22, 102
See application file for complete search history.

(56) References Cited

U.S. PATENT DOCUMENTS

| 6,527,074 | B1 * | 3/2003 | Morishita .................. 180/65.1 |
| 6,656,083 | B2 * | 12/2003 | Esaki ............................. 477/5 |
| 7,247,112 | B2 * | 7/2007 | Foster et al. .................... 475/5 |
| 2007/0107960 | A1 * | 5/2007 | Takami et al. .............. 180/65.6 |
| 2007/0265129 | A1 * | 11/2007 | Kasuya et al. ................ 475/32 |
| 2008/0135314 | A1 * | 6/2008 | Motoike et al. ............ 180/65.2 |
| 2008/0236952 | A1 * | 10/2008 | Shimizu et al. ............ 184/6.22 |

FOREIGN PATENT DOCUMENTS

| JP | A-6-165309 | 6/1994 |
| JP | A-9-170533 | 6/1997 |
| JP | A-2002-349405 | 12/2002 |
| JP | A-2007-216764 | 8/2007 |

OTHER PUBLICATIONS

Dec. 1, 2009 Office Action issued in Japanese Patent Application No. 2008-266575 (with translation).

* cited by examiner

*Primary Examiner*—Khoi Tran
*Assistant Examiner*—Stephen Holwerda
(74) *Attorney, Agent, or Firm*—Oliff & Berridge, PLC

(57) ABSTRACT

When at least one of a condition under which a parking brake is activated, a condition under which a shift lever is shifted to a parking range, a condition under which a shift to the neutral range is executed, and a condition under which a drive termination operation is executed is satisfied during an EV travel mode, a carrier shaft provided coaxially with a crankshaft is rotated by a motor generator, and a cumulative value of a travel distance counter obtained when an engine is stopped is reset.

6 Claims, 3 Drawing Sheets

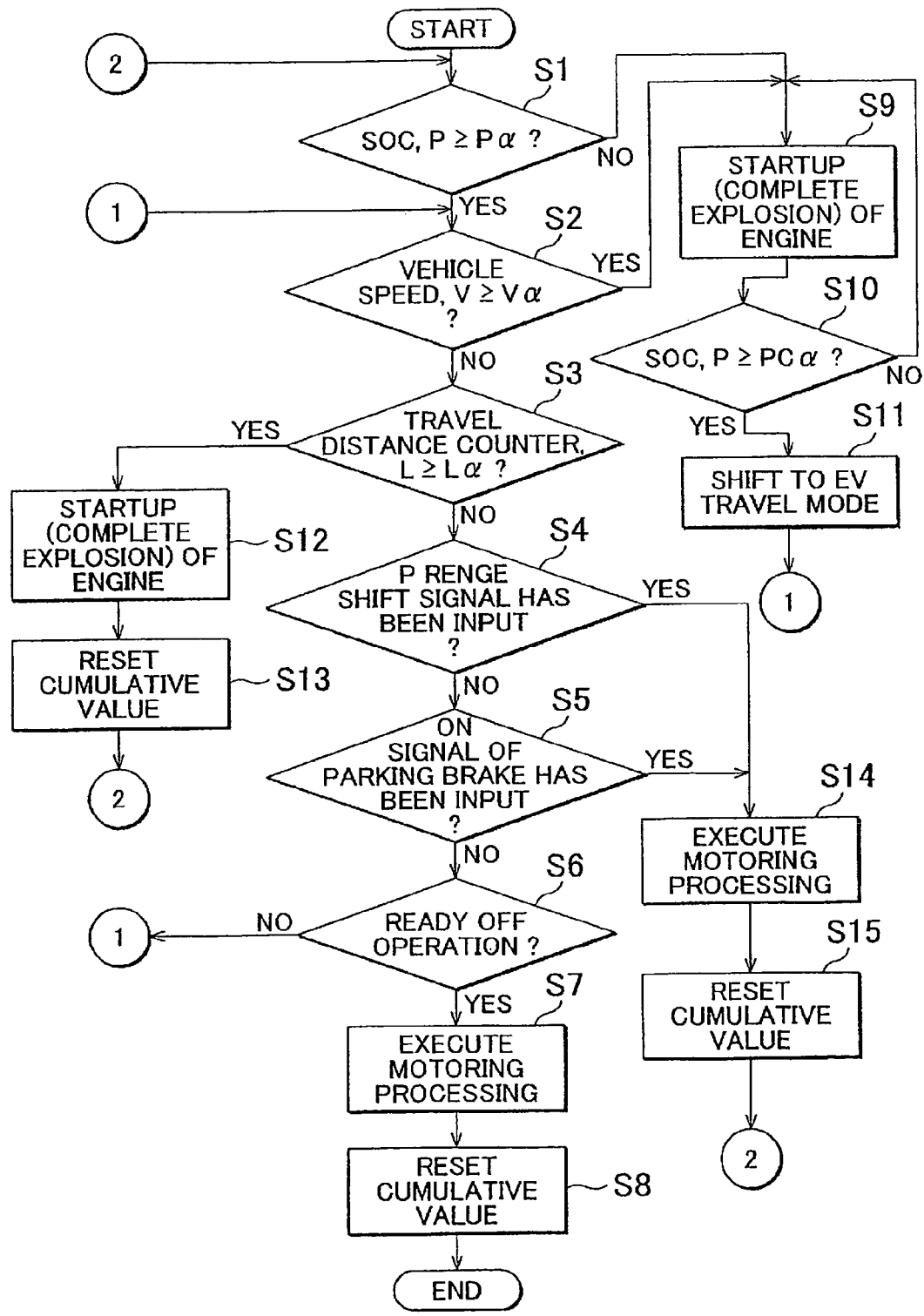

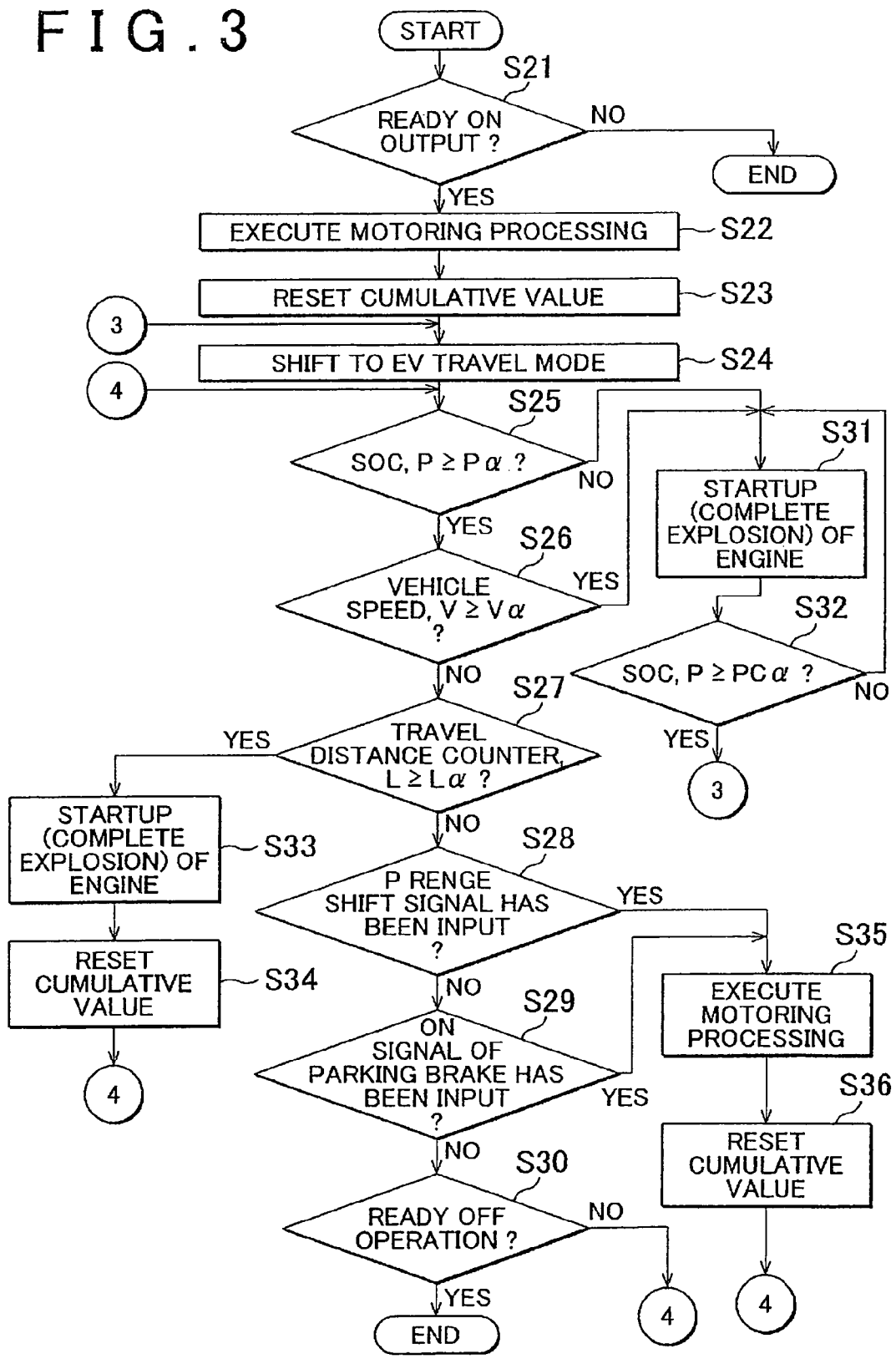

HYBRID VEHICLE

INCORPORATION BY REFERENCE

The disclosure of Japanese Patent Application No. 2008-266575 filed on Oct. 15, 2008 including the specification, drawings and abstract is incorporated herein by reference in its entirety.

BACKGROUND OF THE INVENTION

1. Field of the Invention

The invention relates to a hybrid vehicle, and particularly to a hybrid vehicle that has an internal combustion engine and electric motor to transmit power to a drive wheel through a power transmission mechanism, and that is capable of setting a motor travel mode so as to be able to travel using only the electric motor as a drive power source.

2. Description of the Related Art

In recent years, hybrid vehicles have received a lot of attention as environmentally-friendly automobiles. In addition to an internal combustion engine driven by fuel, a hybrid vehicle has, as the drive power sources, an electric storage device composed of a secondary battery, and a generator that generates vehicle drive power by receiving electricity from the electric storage device.

Such a hybrid vehicle carries out travel control by selecting a mode in which the hybrid vehicle travels using only the output of the generator (electric vehicle (EV) mode) in an operating range, such as during low-speed running at startup where the internal combustion engine does not function efficiently, and selecting a travel mode in which the internal combustion engine is started up when the vehicle speed rises and thereby traveling powers of both the internal combustion engine and the generator can be used (hybrid vehicle (HV) mode).

Particularly, a so-called "plug-in hybrid vehicle" that has an external charging function for charging a secondary battery by means of a commercial power source has recently been developed. Because this hybrid vehicle can travel in the EV mode for comparatively a long time, the internal combustion engine can be deactivated for a longer period of time, and therefore efficiency can be improved.

Incidentally, a power transmission device that transmits power from the internal combustion engine to a drive wheel has a planetary gear mechanism and the like for switching the power between the EV mode and the HV mode of the internal combustion engine and the generator, and the planetary gear mechanism and the like need to be lubricated by lubricant oil.

However, because mainly a crankshaft functioning as an output shaft of the internal combustion engine drives an oil pump supplying the lubricant oil to the planetary gear mechanism and so on, the oil pump is not driven during EV mode travel in which the internal combustion engine is stopped, causing an unlubricated state in the planetary gear mechanism and so on.

To prevent an unlubricated state in the planetary gear mechanism, a hybrid vehicle is available in which the stopping time during which an internal combustion engine is stopped is measured during the EV mode travel and then the internal combustion engine is started up (complete explosion) at the time of the subsequent travel when the measured time exceeds a constant time period (see Japanese Patent Application Publication No. H6-165309 (JP-A-6-165309), for example). According to this hybrid vehicle, because the internal combustion engine can be operated regularly during the EV travel, an oil pump can be driven regularly to supply lubricant oil to the planetary gear mechanism, and thereby deterioration of lubricity of the planetary gear mechanism and so on can be prevented.

Furthermore, a hybrid vehicle is available which, when the internal combustion engine is stopped for a long time during the EV travel, carries out control called motoring based on a cumulative value of a stop history of the internal combustion engine (the travel distance and so on that are obtained when the internal combustion engine is being stopped) to drive a motor coupled to a crankshaft without exploding the internal combustion engine, thereby rotates the crankshaft to drive the oil pump, and thereafter resets the cumulative value of the stop history of the internal combustion engine (see Japanese Patent Application Publication No. 2002-349405 (JP-A-2002-349405), for example).

However, because the hybrid vehicle described in JP-A-6-165309 measures the stopping time of the internal combustion engine during the EV travel in order to completely explode the internal combustion engine in the subsequent travel if the measured time exceeds the constant time period, when the internal combustion engine is stopped for a long time during the EV travel, eventually the fuel is injected to the internal combustion engine, degrading fuel efficiency.

Moreover, because the measured stopping time of the internal combustion engine is accumulated, there is no device for resetting the cumulative value of the measured time when a driver executes a drive termination operation, that is, when the driver turns a power switch off. Therefore, when the driver executes a drive start operation, that is, when the driver turns the power switch on to bring the hybrid vehicle into a travelable state, there is a possibility that the cumulative value of the measured stopping time of the internal combustion engine exceeds the constant time period during the EV travel. As a result, the fuel is injected into the internal combustion engine, deteriorating the fuel. Furthermore, in the hybrid vehicle described in JP-A-2002-349405, the crankshaft is rotated by carrying out motoring without completely exploding the internal combustion engine during the EV travel. For this reason, the motor reaction force is transmitted to a drive wheel, degrading the drivability. In order to prevent the transmission of the motor reaction force to the drive wheel, control needs to be performed to cancel the motor reaction force.

SUMMARY OF THE INVENTION

This invention provides a hybrid vehicle that is capable of lubricating a power transmission mechanism while reliably preventing degradation of fuel efficiency in a motor travel mode.

A first aspect of the invention relates to a hybrid vehicle that has an internal combustion engine that transmits a power to a drive wheel via a power transmission mechanism, and a first electric motor, wherein a motor travel mode in which the hybrid vehicle travels only using the first electric motor as a drive power source can be set, and when a cumulative value of a stop history of the internal combustion engine reaches a predefined upper limit value in the motor travel mode, the motor travel mode is switched to an internal combustion engine travel mode in which the hybrid vehicle travels using the internal combustion engine as a main drive power source. This hybrid vehicle has: a second electric motor that is coupled to an output shaft of the internal combustion engine and capable of generating electricity by receiving a drive power of the internal combustion engine; an electric storage device that is charged by the electricity generated from the second electric motor; a drive unit that drives the first electric motor and the second electric motor by using the electricity from at least the electric storage device; a lubricant oil supply device that is coupled to the output shaft of the internal combustion engine and supplies lubricant oil to at least the power transmission mechanism; at least one of a parking brake detecting device that detects that a parking brake applying a braking force to the drive wheel is activated, a parking range detecting device that detects that a shift to a parking range is executed, a neutral range detecting device that detects that a shift to a neutral range is executed, and a drive termination operation detecting device that detects that a drive termination operation is executed by a driver; and a controller that drives the drive unit to rotate the output shaft by using the second electric motor and resets the cumulative value of the stop history of the internal combustion engine, when at least one of a condition under which the parking brake is activated, a condition under which a shift to the parking range is executed, a condition under which a shift to the neutral range is executed and a condition under which the drive termination operation is executed is satisfied during the motor travel mode.

According to this configuration, in the motor travel mode, when at least one of a condition under which the parking brake is activated, a condition under which a shift to the parking range is executed, a condition under which a shift to the neutral range is executed, and a condition under which the drive termination operation is executed is satisfied, the output shaft is rotated by the second electric motor and the cumulative value of the stop history of the internal combustion engine is reset, the stop history including the travel distance of the hybrid vehicle when the internal combustion engine is stopped and the stopping time of the internal combustion engine. Thus, the lubricant oil supply device can be activated without starting (completely exploding) the internal combustion engine, before the cumulative value of the stop history of the internal combustion engine reaches the upper limit value for starting the internal combustion engine.

Therefore, lubrication of the power transmission mechanism can be reliably performed by the lubricant oil supply device, while preventing degradation of fuel efficiency that can occur in the motor travel mode. In addition, because the output shaft is rotated using the second electric motor when at least one of a condition under which the parking brake is activated, a condition under which a shift to the parking range is executed, a condition under which a shift to the neutral range is executed, and a condition under which the drive termination operation is executed is satisfied, not only is it possible to carry out motoring while the vehicle is stopped, but also the transmission of a reaction force of the second electric motor to the drive wheel can be prevented to inhibit degradation of drivability, and the need for canceling the reaction force of the second electric motor can be eliminated.

Furthermore, because the cumulative value of the stop history of the internal combustion engine is reset when the drive termination operation is executed, the internal combustion engine is prevented from being started suddenly when the subsequent drive start operation is executed, whereby the travel mode can be shifted to the motor travel mode.

A second aspect of the invention relates to a hybrid vehicle that has an internal combustion engine that transmits a power to a drive wheel via a power transmission mechanism, and a first electric motor, wherein a motor travel mode in which the hybrid vehicle travels only using the first electric motor as a drive power source can be set, and when a cumulative value of a stop history of the internal combustion engine reaches a predefined upper limit value in the motor travel mode, the motor travel mode is switched to an internal combustion engine travel mode in which the hybrid vehicle travels using the internal combustion engine as a main drive power source. This hybrid vehicle has: a second electric motor that is coupled to an output shaft of the internal combustion engine and capable of generating electricity by receiving a drive power of the internal combustion engine; an electric storage device that is charged by the electricity generated from the second electric motor; a drive unit that drives the first electric motor and the second electric motor by using the electricity from at least the electric storage device; a lubricant oil supply device that is coupled to the output shaft of the internal combustion engine and supplies lubricant oil to at least the power transmission mechanism; at least one of a parking brake detecting device that detects that a parking brake applying a braking force to the drive wheel is activated, a parking range detecting device that detects that a shift to a parking range is executed, and a neutral range detecting device that detects that a shift to a neutral range is executed; a drive start operation detecting device that detects that a drive start operation is executed by a driver; and a controller that drives the drive unit to rotate the output shaft by using the second electric motor and resets the cumulative value of the stop history of the internal combustion engine, when at least one of the condition that when the drive start operation is executed, the drive unit is driven to rotate the output shaft by using the second electric motor, that the cumulative value of the stop history of the internal combustion engine is reset to shift the travel mode to the motor travel mode, and that the parking brake is activated in the motor travel mode, the condition under which a shift to the parking range is executed, and the condition under which a shift to the neutral range is executed is satisfied.

According to this configuration, because the drive unit is driven to rotate the output shaft by using the second electric motor when the drive start operation is started, the lubricant oil supply device can be activated without starting the internal combustion engine.

Also, when the drive start operation is executed, the cumulative value of the stop history of the internal combustion engine is reset to shift the travel mode to the motor travel mode, the stop history including the travel distance of the hybrid vehicle when the internal combustion engine is stopped and the stopping time of the internal combustion engine. Thus, by executing the current drive start operation after the execution of the previous drive termination operation when the cumulative value of the stop history of the internal combustion engine accumulates to approximately the predefined upper limit value, the internal combustion engine is prevented from being started suddenly after the execution of the present drive start operation, whereby the travel mode can be shifted to the motor travel mode, and degradation of fuel efficiency can be prevented.

Because the output shaft is rotated using the second electric motor and the cumulative value of the stop history of the internal combustion engine is reset when at least one of the condition under which the parking brake is activated, the condition under which a shift to the parking range is executed, and the condition under which a shift to the neutral range is executed is satisfied in the motor travel mode, the lubricant oil supply device can be activated without starting the internal combustion engine, before the cumulative value of the stop history of the internal combustion engine reaches the upper limit value at which the internal combustion engine is started.

Therefore, lubrication of the power transmission mechanism can be reliably performed by the lubricant oil supply device, while preventing degradation of fuel efficiency that can occur in the motor travel mode. In addition, because the output shaft is rotated using the second electric motor when at least one of the condition under which the parking brake is activated, the condition under which a shift to the parking range is executed and the condition under which a shift to the neutral range is executed is satisfied, not only is it possible to carry out motoring while the vehicle is stopped, but also the transmission of a reaction force of the second electric motor to the drive wheel can be prevented to inhibit degradation of drivability, and the need for canceling the reaction force of the second electric motor can be eliminated.

The hybrid vehicle may have an external charging device that is electrically connected to an external power source to charge the electric storage device by means of the external power source.

According to this configuration, because the electric storage device can be charged using the external power source, the motor travel mode can be continued for a long period of time, and consequently fuel consumption can be reduced significantly.

The drive termination operation detecting device may detect the drive termination operation based on detection information from a power switch. Since a drive termination operation can be detected based on the detection information of the power switch, a drive termination operation executed by the driver can be detected reliably.

The drive start operation detecting device may detect a drive start operation based on detection information from the power switch. Since a drive start operation can be detected based on the detection information of the power switch, a drive start operation executed by the driver can be detected reliably.

This invention can provide a hybrid vehicle that is capable of lubricating the power transmission mechanism while reliably preventing degradation of fuel efficiency in the motor travel mode.

A third aspect of the invention relates to a control method for a hybrid vehicle having an internal combustion engine that transmits a power to a drive wheel via a power transmission mechanism, a first electric motor, a second electric motor that is coupled to an output shaft of the internal combustion engine and capable of generating electricity by receiving a drive power of the internal combustion engine, an electric storage device that is charged by the electricity generated from the second electric motor, and a lubricant oil supply device that is coupled to the output shaft of the internal combustion engine and supplies lubricant oil to at least the power transmission mechanism. The control method includes switching a motor travel mode to an internal combustion engine travel mode in which the hybrid vehicle travels using the internal combustion engine as a main drive power source when a cumulative value of a stop history of the internal combustion engine reaches a predefined upper limit value during the motor travel mode in which the hybrid vehicle travels using only the first electric motor as a drive power source; and driving the second electric motor by means of the electricity of the electric storage device, to drive the lubricant oil supply device via the output shaft, and resetting the cumulative value of the stop history of the internal combustion engine, when at least one of a condition under which a parking brake is activated, a condition under which a shift to a parking range is executed, a condition under which a shift to a neutral range is executed and a condition under which a drive termination operation is executed by a driver is satisfied during the motor travel mode.

A fourth aspect of the invention relates to a control method for a hybrid vehicle having an internal combustion engine that transmits a power to a drive wheel via a power transmission mechanism, a first electric motor, a second electric motor that is coupled to an output shaft of the internal combustion engine and capable of generating electricity by receiving a drive power of the internal combustion engine, an electric storage device that is charged by the electricity generated from the second electric motor, and a lubricant oil supply device that is coupled to the output shaft of the internal combustion engine and supplies lubricant oil to at least the power transmission mechanism. The control method includes switching a motor travel mode to an internal combustion engine travel mode in which the hybrid vehicle travels using the internal combustion engine as a main drive power source when a cumulative value of a stop history of the internal combustion engine reaches a predefined upper limit value during the motor travel mode in which the hybrid vehicle travels using only the first electric motor as a drive power source, driving the second electric motor by means of the electricity of the electric storage device when a drive start operation is executed, to drive the lubricant oil supply device via the output shaft, resetting the cumulative value of the stop history of the internal combustion engine, and to shift a travel mode to the motor travel mode, and driving the second electric motor by means of the electricity of the electric storage device, to drive the lubricant oil supply device via the output shaft, and resetting the cumulative value of the stop history of the internal combustion engine, when at least one of a condition under which the parking brake is activated, a condition under which a shift to a parking range is executed is satisfied and a condition under which a shift to a neutral range is executed is satisfied.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is a flowchart of EV travel mode processing, showing the first embodiment of the hybrid vehicle according to the invention; and FIG. 3 is a flowchart of EV travel mode processing, showing a second embodiment of the hybrid vehicle according to the invention.

DETAILED DESCRIPTION OF EMBODIMENTS

First Embodiment

Figure 1:
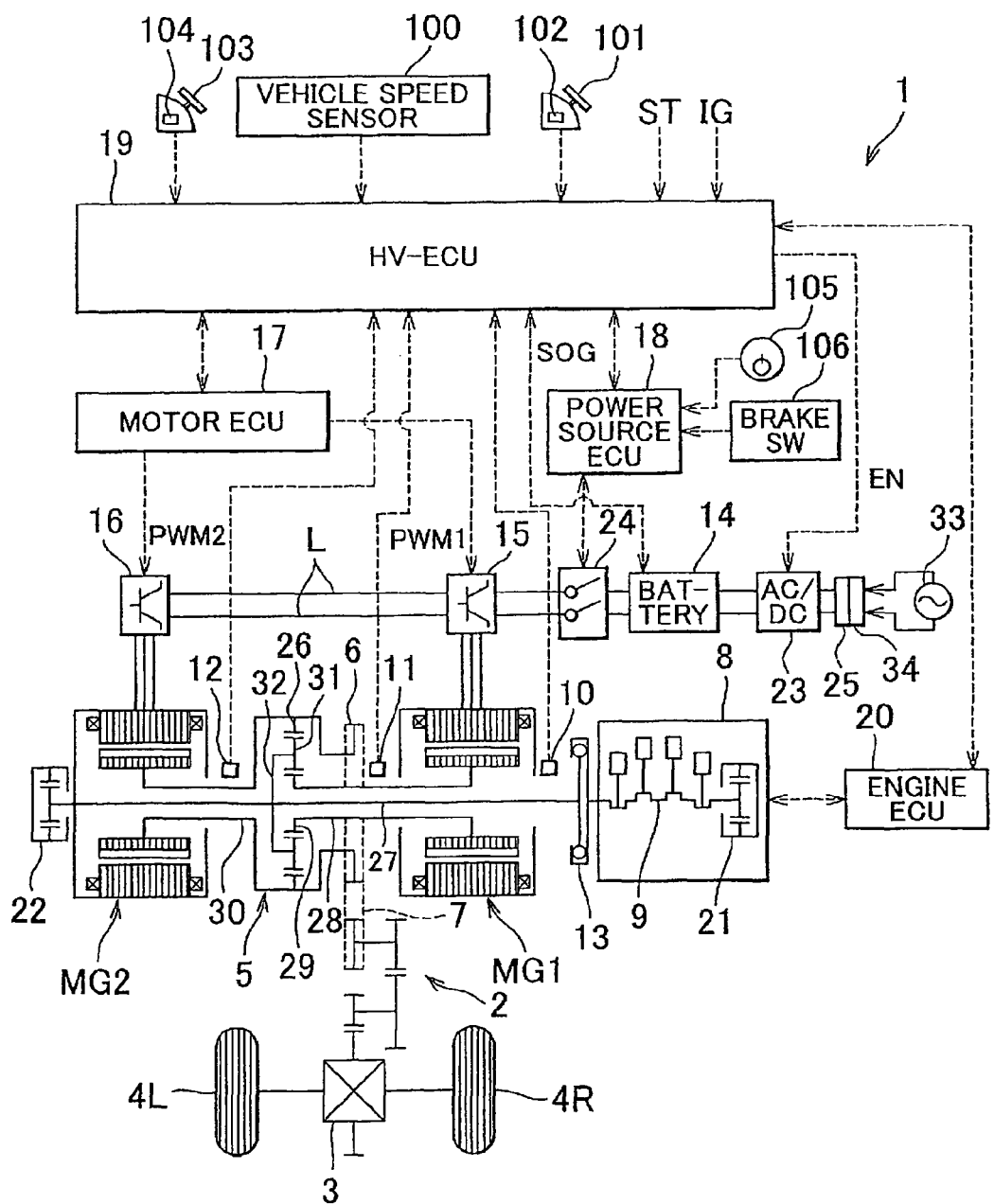
FIG. 1 is a configuration diagram of a hybrid vehicle, showing a first embodiment of a hybrid vehicle according to the invention.

FIGS. 1 and 2 are diagrams showing a first embodiment of a hybrid vehicle according to the invention. In FIG. 1, a hybrid vehicle 1 has a power transmission gear 2, a differential gear 3, drive wheels 4L, 4R, a power distribution mechanism 5 functioning as a power transmission mechanism, a power takeoff gear 6, a chain belt 7, motor generators MG1, MG2, an engine 8 functioning as an internal combustion engine, a crankshaft 9 functioning as an output shaft of the engine 8, resolvers 10, 11, 12, damper 13, a battery 14 (which can be regarded as the electric storage device of the invention), inverters 15, 16, a motor electronic control unit (ECU) 17, a power source ECU 18, an HV-ECU 19, and an engine ECU 20.

The hybrid vehicle 1 also has an oil pump 21, an oil pump 22 (which can be regarded as the lubricant oil supply device of the invention), an alternate current (AC)/direct current (DC) converter 23, a system main relay 24, and a connector 25.

The crankshaft 9 is connected to the power distribution mechanism 5 and the motor generator MG1 via the damper 13, and the damper 13 functions to restrict the amplitude of torsional vibration of the crankshaft 9.

The power takeoff gear 6 is connected to the power transmission gear 2 via the chain belt 7. The power takeoff gear 6 is also coupled to a ring gear 26 of the power distribution mechanism 5 and transmits a power received from the ring gear 26 to the power transmission gear 2 by means of the chain belt 7.

The power transmission gear 2 transmits the power to the drive wheels 4L, 4R through the differential gear 3.

The power distribution mechanism 5 is configured by planetary gear mechanism, and has a sun gear 29, which is coupled to a hollow sun gear shaft 28 that has a shaft center passing through a carrier shaft 27 serving as the output shaft of the engine 8 that is coaxial with the crankshaft 9, the ring gear 26 that is coupled to a ring gear shaft 30 coaxial with the carrier shaft 27, a plurality of planetary pinion gears 31 that are disposed between the sun gear 29 and the ring gear 26 and revolve about an outer circumference of the sun gear 29 while spinning, and a planetary carrier 32 that is coupled to the carrier shaft 27 and rotatably supports a rotation axis of each planetary pinion gear 31.

In the power distribution mechanism 5, the three shafts of the sun gear shaft 28, the ring gear shaft 30 and the carrier shaft 27 that are coupled to the sun gear 29, the ring gear 26 and the planetary carrier 32 respectively function as input/output shafts, and when a power that is input/output to and from any two of the three shafts is determined, a power that is input/output to and from the remaining one shaft is defined based on the determined power that is input/output to and from the two shafts.

The engine 8 generates a power by operating a throttle valve, an ignition device, an injection device and the like that are provided in an intake pipe (not shown) on the basis of a control signal from the engine ECU 20, and then outputs the generated power to the crankshaft 9.

The motor generators MG1, MG2 are each configured by a three-phase AC traction. Each of the motor generators MG1, MG2 has a rotor that has a plurality of permanent magnets on an outer circumferential surface thereof, and a stator that has a three-phase coil wound therearound, the three-phase coil forming a rotating magnetic field. The rotor of the motor generator MG1 is coupled to the sun gear shaft 28, and the rotor of the motor generator MG2 is coupled to the ring gear shaft 30. Each of the motor generators MG1, MG2 is operated as an electric motor that rotates and drives the rotor by using a mutual action between a magnetic field formed by the permanent magnets and a magnetic field formed by the three-phase coil, and is also operated as an electric generator that generates an electromotive force on each end of the three-phase coil by using a mutual action between the magnetic field formed by the permanent magnets and rotation of the rotor.

The motor generator MG1 is incorporated in the hybrid vehicle 1 as a component that is operated as an electric generator driven by the engine 8 and an electric motor capable of starting the engine 8. The motor generator MG2 is incorporated in the hybrid vehicle 1 as an electric motor that drives the drive wheels 4L, 4R by means of the power distribution mechanism 5 and so on. In this embodiment, the motor generator MG2 configures the first electric motor, and the motor generator MG1 configures the second electric motor.

The oil pump 21 is to supply lubricant oil into the engine 8. The oil pump 22 is to supply the lubricant oil into a transaxle having the power distribution mechanism 5.

The oil pump 21 is configured as an internal gear oil pump that is coupled to an end part of the crankshaft 9 and driven. The oil pump 21 lubricates the inside of the engine 8 by supplying the engine 8 with the lubricant oil accumulated in an oil pan (not shown). The oil pump 22 is configured as an internal gear oil pump that is coupled to an end part of the carrier shaft 27 coaxial with the crankshaft 9 and driven. The oil pump 22 lubricates the power distribution mechanism 5 and motor generators MG1, MG2 and the like of the transaxle by supplying the transaxle with the lubricant oil accumulated in the oil pan (not shown).

The battery 14, a chargeable DC power source, is made of, for example, a secondary battery such as a nickel hydride or lithium ion secondary battery. The battery 14 supplies direct current to the inverters 15, 16.

Note that "travel mode" indicates a vehicle state in which the vehicle can travel, that is, an ON state of the power switch for starting/stopping a power output system that will be described hereinafter. Further, "stop mode" indicates a vehicle state in which the vehicle cannot travel, that is, an OFF state of the power switch. The capacitor with large volume may be used as the battery 14.

The inverters 15, 16 receive DC voltage from the battery 14, convert the received DC voltage into AC voltage, and output it to the motor generators MG1, MG2. The inverters 15, 16 convert the AC voltage generated by the motor generators MG1, MG2 into DC voltage to charge the battery 14.

Specifically, electricity lines L that connect the inverters 15, 16 to the battery 14 together are configured as a positive-electrode bus bar and a negative-electrode bus bar that are shared by the inverters 15, 16. When the vehicle is in the travel mode, the electricity generated by one of the motor generators MG1, MG2 can be consumed by the other motor generator MG1, MG2. Therefore, the battery 14 is charged/discharged by the electricity generated by the motor generators MG1, MG2 or insufficient electricity. Furthermore, when the vehicle is in the stop mode, the battery 14 is charged by electricity supplied to a commercial power source on the outside of the vehicle.

The AC/DC converter 23 is operated in accordance with a signal EN from the HV-ECU 19, converts electricity applied from a commercial power source 33 to the connector 25 into a voltage level of the battery 14, and outputs it to the battery 14. The connector 25 is a terminal for inputting the electricity supplied by the commercial power source 33, when charging the battery 14 by using the commercial power source 33 in the stop mode of the vehicle.

When charging the battery 14 by using the commercial power source 33, a connector 34 on the commercial power source 33 side is connected to the connector 25 and thereby commercial voltage of the commercial power source 33 is applied to the connector 25. In this embodiment, the AC/DC converter 23 and the connector 25 can be regarded as the external charging device of the invention.

The motor ECU 17 is configured as a microcomputer that mainly has a central processing unit (CPU) (not shown), and has, in addition to the CPU, a read only memory (ROM) for storing a processing program, a random access memory (RAM) for temporarily storing data, an input/output port, a communication port and so on. The motor ECU 17 receives from the HV-ECU 19 a control command required for driving and controlling the motor generators MG1, MG2.

The motor ECU 17 further receives a detection value of motor current of the motor generators MG1, MG2 from a current sensor (not shown), and a detection value of voltage of the battery 14 from a voltage sensor (not shown).

Moreover, the motor ECU 17 generates a control signal PWM1 for driving the inverter 15 and a control signal PWM2 for driving the inverter 16, on the basis of the control command issued by the HV-ECU 19 and the detection values, and then outputs the generated control signals PWM1, PWM2 to the inverters 15, 16, respectively. In this embodiment, the motor ECU 17 and the inverters 15, 16 configure a drive unit that drives the motor generators MG1, MG2 (this drive unit can be regarded as the drive unit of the invention).

The engine ECU 20 is configured as a microcomputer that mainly has a CPU (not shown), and has, in addition to the CPU, a ROM for storing a processing program, a RAM for temporarily storing data, an input/output ports, a communication port and so on.

The engine ECU 20 receives from the HV-ECU 19 a control command required for driving and controlling the engine 8. The engine ECU 20 generates a control signal for driving the engine 8 on the basis of the control command issued by the HV-ECU 19, and outputs the generated control signal to the engine 8.

The HV-ECU 19 is configured as a microcomputer that mainly has a CPU (not shown), and has, in addition to the CPU, a ROM for storing a processing program, a RAM for temporarily storing data, an input/output port, a communication port and so on.

Rotary angle detection values of the carrier shaft 27, sun gear shaft 28 and ring gear shaft 30 that are sent by the resolvers 10 to 12, phase current from the current sensor (not shown) that is attached to the electricity lines extending from the inverters 15, 16 to the motor generators MG1, MG2, output voltage and output current from the voltage sensor and the current sensor (not shown) attached in the vicinity of an output terminal of the battery 14, battery temperature from a temperature sensor attached to the battery 14, a vehicle speed signal from a vehicle speed sensor 100, a shift position signal from a shift position sensor 102 that detects an operation position of a shift lever 101, and data from various sensors showing the state of the hybrid vehicle 1, such a parking brake sensor 104 that shows an activation state of a parking brake 103 applying a braking force to the drive wheels 4L, 4R, are input to the HV-ECU 19 via an input port.

The HV-ECU 19 computes a remaining capacity (SOC) of the battery 14 based on an integrated value of charging/discharging current detected by the current sensor. In addition, the fact that the shift lever 101 is shifted to a parking range (P range) is detected when a P range shift signal is input as a shift position signal from the shift position sensor 102. The HV-ECU 19 and the shift position sensor 102 can be regarded as the parking range detecting device of the invention.

Moreover, when an ON signal that indicates that the parking brake 103 is activated is input from the parking brake sensor 104, the HV-ECU 19 detects that the parking brake 103 is activated. The HV-ECU 19 and the parking brake sensor 104 can be regarded as the parking brake detecting device.

The HV-ECU 19 is also connected to the engine ECU 20 via the communication port, so as to input, from the engine ECU 20 if necessary, detection signals obtained from the various sensors attached to the engine 8 and computational results obtained based on these detection signals, and outputs a control signal as a command to drive and control the engine 8, to the engine ECU 20.

The power source ECU 18 is configured as a microprocessor that mainly has a CPU (not shown), and has, in addition to the CPU, a ROM for storing a processing program, a RAM for temporarily storing data, an input/output port, and a communication port.

A push signal from a power switch 105 disposed in a front panel of the driver's seat, and a brake switch signal from a brake switch 106 detecting depression of the brake pedal (not shown) are input to the power source ECU 18 via the input port. The power source ECU 18 outputs, via the output port, an ON/OFF signal and the like for a relay that applies or disconnects the power source to a low-voltage system (not shown) that is used by an ON/OFF signal sent to the system main relay 24 applying or disconnecting the power source to the electricity lines L (high-voltage system).

When the power switch 105 is pressed and thereby the push signal is input when the brake switch signal from the brake switch 106 is ON, i.e., when the brake pedal is depressed, the power source ECU 18 outputs the ON signal to the system main relay 24 if the system main relay 24 is not ON. The power source ECU 18 then sends an ON output of an ignition signal (IG signal) and start signal (ST signal) to the HV-ECU 19 to start up the power output system.

Note that the power output system is configured mainly by the engine 8, power distribution mechanism 5, motor generators MG1, MG2, inverters 15, 16, battery 14, system main relay 24 and HV-ECU 19, and responsible for a system in which the vehicle can be caused to travel by the engine 8 and both or either one of the motor generators MG1, MG2.

After confirming that the power output system is in a startup state, the HV-ECU 19 that has input the ST signal sends to the power source ECU 18 an ON output of a ready signal (RDY signal) indicating that the power output system is in a startup state.

After confirming based on the ON output of the ST signal that the power output system is in the startup state, the HV-ECU 19 maintains a state in which the power output system is not started, and maintains an OFF output of the ready signal (RDY signal) in order to notify the power source ECU 18 of that the power output system is not started.

When the power switch 105 is pressed and thereby the push signal is input when the vehicle is stopped while the power output system is started, the power source ECU 18 confirms that the shift range is in the P range and thereafter shuts down the entire hybrid vehicle 1 by outputting the OFF signal to the system main relay 24. At this moment, the HV-ECU 19 sends an OFF output of the ready signal (RDY signal) to the power source ECU 18 on the basis of the OFF output of the ST signal.

In other words, once the driver presses the power switch signal 105 to input the push signal to the power source ECU 18 when starting to drive the vehicle, the HV-ECU 19 detects that the drive start operation is executed. Once the drive presses the power switch 105 to input the push signal to the HV-ECU 19 when ending the drive of the vehicle, the HV-ECU 19 detects that the drive termination operation is executed.

In this embodiment, the HV-ECU 19 and the power switch 105 configure the drive termination operation detecting device and the drive start operation detecting device that detect, respectively, the drive termination operation and the drive start operation on the basis of the detection information from the power switch 105 (the drive termination operation detecting device and the drive start operation detecting device can be regarded as the drive termination operation detecting device and the drive start operation detecting device of the invention).

In this embodiment, by temporally integrating the vehicle speed signal sent by the vehicle speed sensor 100, the HV-ECU 19 calculates an integrated value of the travel distance when the engine 8 is stopped, in the motor travel mode (to be referred to as "EV travel mode" hereinafter), and this travel distance represents a stop history obtained when the engine 8 is stopped.

Note that the integrated travel distance obtained when the engine 8 is stopped is counted by the CPU of the HV-ECU 19, and accumulated and stored in a travel distance counter stored in the RAM. To obtain the stop history, a period of time during which the engine 8 is stopped in the EV travel mode may be counted by using a timer, and a cumulative value of this time period may be stored in a stopping time counter of the RAM, as a cumulative value (integrated value) of the stop history.

The HV-ECU 19 switches, in the EV travel mode, travel powers of both the engine 8 and the motor generator MG2 to an available travel mode (HV mode) when the integrated travel distance reaches a predefined upper limit value. In other words, the HV-ECU 19 switches the travel powers to an internal combustion engine travel mode in which the vehicle travels using the engine 8 as the main drive power source.

On the other hand, when the ON signal is input from the parking brake 104, when the P range shift signal indicating that the shift lever is shifted to the P range is input from the shift position sensor 102, or when the driver presses the power switch 105 to input the push signal when the vehicle is stopped while the power output system is started, that is, when the OFF output of the ready signal (RDY signal) is sent to the power source ECU 18, the HV-ECU 19 EV, in the EV travel mode, transits a motor drive signal to the motor ECU 17. In response to the input of the motor drive signal from the HV-ECU 19, the motor ECU 17 controls the inverter 15 to drive the motor generator MG1.

At this moment, the HV-ECU 19 does not transmit a signal for starting up (completely exploding) the engine 8 to the engine ECU 20. Because the rotor of the motor generator MG1 rotates as soon as the motor generator MG1 is driven, the planetary carrier 32 is rotated via the sun gear 29. For this reason, the carrier shaft 27 of the planetary carrier 32 that is provided coaxially with the crankshaft 9 is rotated, whereby the oil pump 22 is driven, and then the lubricant oil is supplied from the oil pump 22 to the power distribution mechanism 5 and the motor generators MG1, MG2.

Further, when any one of the conditions described above is satisfied, the HV-ECU 19 resets the cumulative value stored in the travel distance counter of the RAM and returns the cumulative value to "0." In this embodiment, the HV-ECU 19 can be regarded as the controller of the invention.

Next, EV travel mode processing is described based on the flowchart shown in FIG. 2. The flowchart of FIG. 2 shows a procedure for the EV travel mode processing executed by the CPU of the HV-ECU 19.

In FIG. 2, first, in order to monitor a charge state of the battery 14, the CPU of the HV-ECU 19 determines in the EV travel mode, based on the integrated value of the charging/discharging current detected by the current sensor, whether or not an actual remaining capacity P of the battery 14 is at least a remaining capacity $P\alpha$ required for charging the battery 14 (step S1).

When it is determined in step S1 that the actual capacity P of the battery 14 is less than the charge start requesting remaining capacity $P\alpha$ of the battery 14, the CPU transmits an engine start signal to the engine ECU 20 to start up (completely explode) the engine (step S9).

As a result, the EV travel mode is shifted to the HV travel mode so as to obtain the travel mode (HV mode) where the vehicle travels using both the engine 8 and the motor generator MG2, and the battery 14 is charged by the motor generator MG2.

In addition, in the HV mode it is determined whether or not the actual remaining capacity P of the battery 14 is at least a charge termination remaining capacity $PC\alpha$ of the battery 14, that is, whether or not the battery 14 is charged sufficiently (step S10).

When it is determined in step S10 that the actual remaining capacity P of the battery 14 is less than the charge termination remaining capacity $PC\alpha$ of the battery 14, the CPU determines that the amount of charge in the battery 14 is insufficient, and returns to step S9. When it is determined that the actual remaining capacity P of the battery 14 is at least the charge termination remaining capacity $PC\alpha$ of the battery 14, the CPU determines that the amount of charge in the battery 14 is sufficient and shifts the travel mode to the EV travel mode (step S11).

When it is determined in step S1 that the actual remaining capacity P of the battery 14 is at least the remaining capacity $P\alpha$, or when the travel mode is shifted to the EV travel mode in step S11, the CPU determines, based on the detection information from the vehicle speed sensor 100, whether or not actual vehicle speed V is at least a vehicle speed threshold value $V\alpha$ (step S2). When it is determined that the actual vehicle speed V is at least the vehicle speed threshold value $V\alpha$, the CPU shifts the processing to step S9. When it is determined that the actual vehicle speed V is less than the vehicle speed threshold value $V\alpha$, the CPU advances the processing to step S3.

In step S3, the CPU determines whether or not the cumulative value L stored in the travel distance counter of the RAM is at least a threshold value $L\alpha$ of the travel distance counter, which is a predefined upper limit value. Accordingly, the CPU determines whether or not the travel distance of the hybrid vehicle 1 in which the engine 8 is stopped is at a level where the lubricant oil needs to be supplied to the power distribution mechanism 5.

When it is determined in step S3 that the cumulative value L of the travel distance counter is at least the threshold value $L\alpha$, the CPU proceeds to step S12 to start up (completely explode) the engine 8, and thereby transmits the drive power of the crankshaft 9 to the carrier shaft 27 to drive the oil pump 22. As a result, the lubricant oil is supplied from the oil pump 22 to the power distribution mechanism 5 and the motor generators MG1, MG2. Subsequently, the CPU resets the cumulative value of the travel distance counter of the RAM (step S13) and then shifts the processing to step S1.

In addition, when it is determined in step S3 that the cumulative value L of the travel distance counter is less than the threshold value $L\alpha$ of the travel distance, which is the predefined upper limit value, the CPU determines whether or not the shift position sensor 102 inputs the P range shift signal (step S4).

When it is determined in step S4 that the P range shift signal is input from the shift position sensor 102, the CPU determines that the shift lever is shifted to the P range, drives the motor generator MG1 without transmitting a signal for starting up (completely exploding) the engine 8 to the engine ECU 20, and executes motoring processing for rotating the carrier shaft 27 provided coaxially with the crankshaft 9 (step S14). As a result, the lubricant oil is supplied from the oil pump 22 to the power distribution mechanism 5 and the motor generators MG1, MG2.

Next, the CPU resets the cumulative value of the travel distance counter of the RAM (step S15), and thereafter shifts the processing to step S1. Moreover, when the P range shift signal is not input in step S4, the CPU determines whether or not an ON signal for detecting the activation of the parking brake 103 is input (step S5). When the ON signal is input, the CPU determines that the parking brake 103 is operated, and advances the processing to step S14. When the ON signal is not input, the CPU determines that the parking brake 103 is not operated, and advances the processing to step S6. Note that the ON signal is input to the parking brake 103 when the shift lever is shifted to a neutral range and the hybrid vehicle 1 is stopped.

In step S6, the CPU determines whether or not the power switch 105 is pressed while the vehicle is stopped when the power output system is started, and the OFF output of the ST signal is sent from the power source ECU 18 and thereby the OFF output of the ready signal (RDY signal) is sent from the HV-ECU 19 to the power source ECU 18. In other words, the CPU determines whether a ready OFF operation, which is a power output system startup termination operation, is performed or not.

When CPU determines that the ready OFF operation is carried out, the CPU drives the motor generator MG1 without transmitting the signal for starting up (completely exploding) the engine 8 to the engine ECU 20, and executes the motoring processing for rotating the carrier shaft 27 provided coaxially with the crankshaft 9 (step S7). Consequently, the lubricant oil is supplied from the oil pump 22 to the power distribution mechanism 5 and the motor generators MG1, MG2, and thereafter the CPU resets the cumulative value of the travel distance counter of the RAM (step S8), and ends this processing. When it is determined in step S6 that the ready OFF operation is not carried out, the CPU shifts the processing to step S1.

As described above, in this embodiment, in the EV travel mode, when a condition under which the parking brake 103 is activated, a condition under which the shift lever 101 is shifted to the parking range, or a condition under which the drive termination operation is executed is satisfied, the carrier shaft 27 provided coaxially with the crankshaft 9 is rotated by the motor generator MG1, and the cumulative value of the travel distance counter is reset when the engine 8 is stopped. Thus, the oil pump 22 can be activated without starting up the engine 8, before the cumulative value of the travel distance counter in the EV travel mode reaches the upper limit value for starting up (completely exploding) the engine 8.

As a result, while preventing degradation of fuel efficiency in the EV travel mode, the power distribution mechanism 5 and the motor generators MG1, MG2 can be lubricated reliably by the oil pump 22. In addition, in this embodiment, the crankshaft 9 is rotated by the motor generator MG1 when a condition under which the parking brake 103 is activated, a condition under which the shift lever 101 is shifted to the parking range, or a condition under which the drive termination operation is executed is satisfied. Thus, not only is it possible to carry out motoring while the hybrid vehicle 1 is stopped, but also the transmission of a reaction force of the motor generator MG1 to the drive wheels 4L, 4R can be prevented to inhibit degradation of drivability, and the need for canceling the reaction force of the motor generator MG1 can be eliminated.

In this embodiment, when the drive termination operation is executed by operating the power switch 105, the cumulative value stored in the travel distance counter is reset. Therefore, the engine 8 is prevented from being started suddenly when the subsequent drive start operation is executed by the power switch 105, whereby the travel mode can be shifted to the EV travel mode.

In this embodiment, the battery 14 can be electrically connected to the commercial power source 33 via the AC/DC converter 23 and the connector 25, to charge the battery 14 by means of the commercial power source 33. Therefore, the EV travel mode can be continued for a long period of time, and consequently fuel consumption can be reduced significantly.

In this embodiment, the HV-ECU 19 detects the drive termination operation based on the detection information from the power switch 105. Therefore, the drive termination operation (ready OFF) performed by the driver can be detected reliably.

Second Embodiment

FIG. 3 is a diagram showing a second embodiment of the hybrid vehicle according to the invention. The description of the configuration of the hybrid vehicle 1 is provided using FIG. 1, as it is the same as that of the first embodiment.

In this embodiment, when the driver depresses the brake pedal and operates the power switch 105 when starting to drive the vehicle, the power source ECU 18 outputs the ON signal to the system main relay 24, and sends the ON outputs of the ignition signal (IG signal) and the start signal (ST signal) to the HV-ECU 19, to start up the power output system.

In response to the input of the ST signal, the HV-ECU 19 confirms that the power output system can be started up, and thereafter sends the ON output of the ready signal (RDY signal) to the power source ECU 18 to notify the power source ECU 18 of that the power output system is in the startup state. In this embodiment, the HV-ECU 19 and the power switch 105 configure the drive start operation detecting device that detects that the drive start operation is executed by the driver (the drive start operation detecting device can be regarded as the drive start operation detecting device of the invention).

When the power switch 105 is operated and the ON output of the ready signal is sent, the HV-ECU 19 drives the motor generator MG1 and rotates the carrier shaft 27 to activate the oil pump 22. The HV-ECU 19 also resets the cumulative value of the travel distance counter (cumulative value of the stop history) stored in the RAM when the engine 8 is stopped, and shifts the travel mode to the EV mode.

Further, in the EV travel mode, the HV-ECU 19 of this embodiment drives the motor generator MG1 and rotates the carrier shaft 27 to activate the oil pump 22 under the condition that the parking brake 103 is activated or under the condition that the shift lever is shifted to the P range. The HV-ECU 19 also resets the cumulative value of the travel distance counter stored in the RAM. In this embodiment, the HV-ECU 19 can be regarded as the controller of the invention.

Next, EV travel mode processing is described based on the flowchart shown in FIG. 3. The flowchart of FIG. 3 shows a procedure for the EV travel mode processing executed by the CPU of the HV-ECU 19.

In FIG. 3, first, based on that the power switch 105 is operated by the driver when starting to drive the vehicle, the CPU of the HV-ECU 19 determines whether the ready ON output is sent or not (step S21). When it is determined that the ready ON output is not sent, this processing is ended.

When it is determined in step S21 that the ready ON output is not sent, the CPU determines that the power output system is started up, drives the motor generator MG1 without transmitting a signal for starting up (completely exploding) the engine 8 to the engine ECU 20, and executes the motoring processing for rotating the carrier shaft 27 provided coaxially with the crankshaft 9 (step S22). As a result, the lubricant oil is supplied from the oil pump 22 to the power distribution mechanism 5 and the motor generators MG1, MG2.

Next, the CPU resets the cumulative value stored in the travel distance counter of the RAM (step S23), and thereafter shifts the travel mode to the EV travel mode (step S24). Then, in order to monitor the charge state of the battery 14, the CPU determines, based on the integrated value of the charging/discharging current detected by the current sensor, whether or not the actual remaining capacity P of the battery 14 is at least the remaining capacity Pα required for charging the battery 14 (step S25).

When it is determined in step S25 that the actual remaining capacity P of the battery 14 is less than the charge start requesting remaining capacity Pα of the battery 14, the CPU transmits the engine start signal to the engine ECU 20 to start up (completely explode) the engine (step S31).

As a result, the EV travel mode is shifted to the HV travel mode so as to obtain the travel mode (HV mode) where the vehicle travels using both the engine 8 and the motor generator MG2, and the battery 14 is charged by the motor generator MG2.

In addition, in the HV mode it is determined whether or not the actual remaining capacity P of the battery 14 is at least the charge termination remaining capacity PCα of the battery 14, that is, whether or not the battery 14 is charged sufficiently (step S32).

When it is determined in step S32 that the actual remaining capacity P of the battery 14 is less than the charge termination remaining capacity PCα of the battery 14, the CPU determines that the amount of charge in the battery 14 is insufficient, and returns to step S31. When it is determined that the actual remaining capacity P of the battery 14 is at least the charge termination remaining capacity PCα of the battery 14, the CPU determines that the amount of charge in the battery 14 is sufficient and advances the processing to step S24 to shift the travel mode to the EV travel mode.

When it is determined in step S25 that the actual remaining capacity P of the battery 14 is at least the remaining capacity Pα, the CPU determines, based on the detection information from the vehicle speed sensor 100, whether or not the actual vehicle speed V is at least the vehicle speed threshold value Vα (step S26). When it is determined that the actual vehicle speed V is at least the vehicle speed threshold value Vα, the CPU shifts the processing to step S31. When it is determined that the actual vehicle speed V is less than the vehicle speed threshold value Vα, the CPU advances the processing to step S27.

In step S27, the CPU determines whether or not the cumulative value L stored in the travel distance counter of the RAM is at least the threshold value Lα of the travel distance counter, which is a predefined upper limit value. Accordingly, the CPU determines whether or not the travel distance of the hybrid vehicle 1 in which the engine 8 is stopped is at a level where the lubricant oil needs to be supplied to the power distribution mechanism 5.

When it is determined in step S27 that the cumulative value L of the travel distance counter is at least the threshold value Lα, the CPU proceeds to step S33 to start up (completely explode) the engine 8, and thereby transmits the drive power of the crankshaft 9 to the carrier shaft 27 to drive the oil pump 22. As a result, the lubricant oil is supplied from the oil pump 22 to the power distribution mechanism 5 and the motor generators MG1, MG2. Subsequently, the CPU resets the cumulative value of the travel distance counter of the RAM (step S34) and then shifts the processing to step S25.

In addition, when it is determined in step S27 that the cumulative value L of the travel distance counter is less than the threshold value Lα of the travel distance, which is the predefined upper limit value, the CPU determines whether or not the shift position sensor 102 inputs the P range shift signal (step S28).

When it is determined in step S28 that the P range shift signal is input from the shift position sensor 102, the CPU determines that the shift lever is shifted to the P range, drives the motor generator MG1 without transmitting a signal for starting up (completely exploding) the engine 8 to the engine ECU 20, and executes the motoring processing for rotating the carrier shaft 27 provided coaxially with the crankshaft 9 (step S35). As a result, the lubricant oil is supplied from the oil pump 22 to the power distribution mechanism 5 and the motor generators MG1, MG2.

Next, the CPU resets the cumulative value of the travel distance counter of the RAM (step S36), and thereafter shifts the processing to step S25.

Moreover, when the P range shift signal is not input in step S28, the CPU determines whether or not the ON signal for detecting the activation of the parking brake 103 is input (step S29). When the ON signal is input, the CPU determines that the parking brake 103 is operated, and advances the processing to step S35. When the ON signal is not input, the CPU determines that the parking brake 103 is not operated, and determines whether the ready OFF operation is carried out or not (step S30). When it is determined in step S30 that the ready OFF operation is not carried out, the CPU shifts the processing to step S25. When it is determined that the ready OFF operation is carried out, the CPU determines that the drive termination operation is executed by the driver operating the power switch 105, and ends this processing.

As described above, in this embodiment, at the time of the start of the vehicle, the carrier shaft 27 provided coaxially with the crankshaft 9 is rotated by the motor generator MG1 when the driver operates the power switch 105. Therefore, the oil pump 22 can be activated without starting up the engine 8.

Furthermore, when the ready ON operation that is the drive start operation is executed, the cumulative value of the travel distance counter is reset while the engine 8 is stopped, and the travel mode is shifted to the EV travel mode. Therefore, the present ready ON operation is executed after the previous ready OFF operation is executed when counter values of the travel distance counter obtained while the engine 8 is stopped are accumulated to approximately the threshold value Lα. As a result, the engine 8 is prevented from being started (completely exploded) suddenly after the present ready ON operation, and the travel mode can be shifted to the EV travel mode, whereby degradation of fuel efficiency can be prevented.

In addition, the carrier shaft 27 provided coaxially with the crankshaft 9 is rotated by the motor generator MG1 and the cumulative value of the travel distance counter is reset while the engine 8 is stopped, under the condition that the parking brake 103 is activated or under the condition that the shift lever 101 is shifted to the parking range in the EV travel mode. Thus, the oil pump 22 can be activated without starting up the engine 8, before the cumulative value of the travel distance counter obtained when the engine 8 is stopped reaches the upper limit value for starting up the engine 8.

As a result, while preventing degradation of fuel efficiency in the EV travel mode, the power distribution mechanism 5 and the motor generators MG1, MG2 can be lubricated reliably by the oil pump 22. In addition, in this embodiment, the crankshaft 9 is rotated by the motor generator MG1 under the condition that the ready ON operation is executed as the drive start operation, under the condition that the parking brake 103 is activated, or under the condition that the shift lever 101 is shifted to the parking range. Thus, not only is it possible to carry out the motoring when the hybrid vehicle 1 is stopped, but also the transmission of the reaction force of the motor generator MG1 to the drive wheels 4L, 4R can be prevented to inhibit degradation of drivability, and the need for canceling the reaction force of the motor generator MG1 can be eliminated.

In this embodiment, the HV-ECU 19 detects the drive start operation (ready ON operation) based on the detection information from the power switch 105. Thus, the drive start operation performed by the driver can be detected reliably.

Note that in each of the embodiments described above, when the shift lever is shifted to the parking range in the EV travel mode, the carrier shaft 27 provided coaxially with the crankshaft 9 is rotated by the motor generator MG1, and the cumulative value of the travel distance counter obtained while the engine 8 is stopped is reset. However, the carrier shaft 27 provided coaxially with the crankshaft 9 may be rotated by the motor generator MG1 and the cumulative value of the travel distance counter obtained while the engine 8 is stopped may be reset, when the shift lever 101 is shifted to the neutral range.

The embodiments that are disclosed herein are merely representative and should not be considered restrictive in anyway.

As described above, the hybrid vehicle according to this invention has the effect of lubricating the power transmission mechanism while reliably preventing degradation of fuel efficiency in the motor travel mode. The hybrid vehicle according to the invention is useful as a hybrid vehicle or the like that has the internal combustion engine and the electric motors for transmitting a power to the drive wheels via the power transmission device and is capable of setting the motor travel mode in which the hybrid vehicle travels using only the electric motors as the drive power source.

What is claimed is:

1. A hybrid vehicle that includes an internal combustion engine and a first electric motor that transmit a power to a drive wheel via a power transmission mechanism, and can set to a motor travel mode in which the hybrid vehicle travels using only the first electric motor as a drive power source, switches the motor travel mode to an internal combustion engine travel mode in which the hybrid vehicle travels using the internal combustion engine as a main drive power source when a cumulative value of a stop history of the internal combustion engine reaches a predefined upper limit value during the motor travel mode, the hybrid vehicle comprising:
a second electric motor that is coupled to an output shaft of the internal combustion engine and capable of generating electricity by receiving a drive power of the internal combustion engine;
an electric storage device for being charged by the electricity generated from the second electric motor;
a drive device for driving the first electric motor and the second electric motor by using the electricity from at least the electric storage device;
a lubricant oil supply device for being coupled to the output shaft of the internal, combustion engine and supplying lubricant oil to at least the power transmission mechanism;
a parking brake detecting device for detecting that a parking brake applying a braking force to the drive wheel is activated;
a parking range detecting device for detecting that a shift to a parking range is executed;
a drive termination operation detecting device for detecting that a drive termination operation is executed by a driver; and a control device for driving the drive device to rotate the output shaft using the second electric motor, operating the lubricant oil supply device using the second electric motor, and resetting the cumulative value of the stop history of the internal combustion engine when one of a condition under which the parking brake is activated, a condition under which a shift to the parking range is executed, and a condition under which the drive termination operation is executed is satisfied during the motor travel mode.

2. A hybrid vehicle that includes an internal combustion engine and a first electric motor that transmit a power to a drive wheel via a power transmission mechanism, and can set to a motor travel mode in which the hybrid vehicle travels using only the first electric motor as a drive power source, switches the motor travel mode to an internal combustion engine travel mode in which the hybrid vehicle travels using the internal combustion engine as a main drive power source when a cumulative value of a stop history of the internal combustion engine reaches a predefined upper limit value during the motor travel mode, the hybrid vehicle comprising:
a second electric motor that is coupled to an output shaft of the internal combustion engine and capable of generating electricity by receiving a drive power of the internal combustion engine;
an electric storage device that is charged by the electricity generated from the second electric motor;
a drive device that drives the first electric motor and the second electric motor by using the electricity from at least the electric storage device;
a lubricant oil supply device that is coupled to the output shaft of the internal combustion engine and supplies lubricant oil to at least the power transmission mechanism;
a parking brake detecting device that detects that a parking brake applying a braking force to the drive wheel is activated;
a parking range detecting device that detects that a shift to a parking range is executed;
a drive start operation detecting device that detects that a drive start operation is executed by a driver; and
a control device that drives the drive device to rotate the output shaft using the second electric motor, operating the lubricant oil supply device using the second electric motor, and resetting the cumulative value of the stop history of the internal combustion engine to shift a travel mode to the motor travel mode when the drive start operation is executed by the driver.

3. The hybrid vehicle according to claim 1, comprising an external charging device that is electrically connected to an external power source and charging the electric storage device by using the external power source.

4. The hybrid vehicle according to claim 1, wherein the drive termination operation detecting device detects the drive termination operation based on detection information from a power switch.

5. The hybrid vehicle according to claim 2, comprising an external charging device that is electrically connected to an external power source and charging the electric storage device using the external power source.

6. The hybrid vehicle according to claim 2, wherein the drive start operation detecting device detects the drive start operation based on detection information from a power switch.

* * * * *